United States Patent
Muraishi (10) Patent No.: US 6,786,544 B1
(45) Date of Patent: Sep. 7, 2004

(54) SEAT BACK STRUCTURE OF VEHICLE SEAT

(75) Inventor: Masami Muraishi, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 10/702,452

(22) Filed: Nov. 7, 2003

(51) Int. Cl.$^7$ .............................................. B60N 2/427
(52) U.S. Cl. .............................. 297/216.14; 297/452.56
(58) Field of Search .................. 297/216.13, 216.14, 297/452.1, 452.18, 452.55, 452.56

(56) References Cited

U.S. PATENT DOCUMENTS

| | | | | | |
|---|---|---|---|---|---|
| 2,098,456 | A | * | 11/1937 | Leader | 297/452.56 |
| 4,530,541 | A | * | 7/1985 | Resag et al. | 297/452.18 |
| 4,883,320 | A | * | 11/1989 | Izumida et al. | 297/452.56 |
| 5,044,693 | A | * | 9/1991 | Yokota | 297/452.18 |
| 5,129,707 | A | * | 7/1992 | Yamauchi | 297/216.14 |
| 5,393,126 | A | * | 2/1995 | Boulva | 297/452.56 |
| 5,669,661 | A | * | 9/1997 | Pajon | 297/216.13 |
| 6,231,125 | B1 | * | 5/2001 | Maeda et al. | 297/452.56 |
| 6,478,381 | B1 | * | 11/2002 | Cramb et al. | 297/452.13 |
| 2002/0096932 | A1 | * | 7/2002 | Fujita et al. | 297/452.56 |
| 2003/0122413 | A1 | * | 7/2003 | Cramb et al. | 297/452.56 |

* cited by examiner

*Primary Examiner*—Peter R. Brown
(74) *Attorney, Agent, or Firm*—Browdy and Neimark, P.L.L.C.

(57) ABSTRACT

A seat back structure of vehicle seat which is reduced in thickness and yet deformable to provide a deep cushiony touch to a back of passenger. According thereto, an elastic back support element and a back board element are respectively provided in one and another sides of seat back, and a movable connection element is provided so as to allow displacement of the back board element from a home position, while allowing the elastic back support element to be resiliently warped. The back board element is normally biased by a biasing element of the home position. A stopper element is defined in the seat back for preventing movement of the back board element from the home position to the elastic back support element. The back board element per se may be formed by a plurality of plate elements connected movably with one another.

14 Claims, 4 Drawing Sheets

SEAT BACK STRUCTURE OF VEHICLE SEAT

BACKGROUND OF THE INVENTION

1. Field of the Invention

The present invention relates to a structure of seat back of a vehicle seat, wherein the seat back is provided, at the back side thereof, with a back board which can serve as a load-carrying platform or cargo loading area in a vehicle.

2. Description of Prior Art

Among various kinds of seats, there is known a fold-down rear seat of the type allowing its seat back to be foldable onto its seat cushion, thereby allowing the back side of the seat back to be transformed into a load-carrying platform area in a cabin section or a cargo loading section in a vehicle cabin, as found in a recreational vehicle, a mini-van, a station wagon, a small-sized vehicle, or the like.

In most cases, this sort of fold-down rear seat is provided with a back board at the back side thereof. One typical example of such back board is known from the Japanese Laid-Open Patent Publication No. 2000-125796, according to which, one piece of robust flat panel having a high rigidity is disclosed.

Normally, a cabin or a cargo loading section in vehicle, which can accommodate the fold-down rear seat of the foregoing type, requires formation of a storage space in the floor so as to allow both of seat cushion and seat back of the seat to be stored in that storage space, such that, when the seat back is folded down onto the seat cushion, the back side of the seat back is set in registry with the upper surface of the floor. In view of such structural requirement, it is desirable that a whole of the seat, or, particularly the seat back, should be made small in thickness. Particularly, the same goes for a small-sized vehicle.

Certainly, there has been known a seat back of the type allowing its thickness to be reduced. For example, the Japanese Laid-Open Patent Pub. No. 11-192138 discloses a seat back wherein an elastic sheet element is provided on a rigid back board, thereby realizing a relatively thin back support surface provided with elastic and cushiony property, on which the back or upper body potion of the passenger is resiliently supported.

However, even such conventional thin seat back has been found defective in that a degree of elasticity of the elastic sheet element is limited by the rigid back board, resulting in a poor cushioning effect. In other words, a passenger resting on the seat back will feel, at his or her back, the hardness of the back board, due to the reduced thickness of the elastic sheet element in the seat back, with the result that a satisfactory comfortable seating touch is not attained.

SUMMARY OF THE INVENTION

In view of the above-stated drawbacks, it is a purpose of the present invention to provide an improved seat back structure of vehicle seat which not only permits its use as a load-carrying platform, but also permits a reduced thickness thereof, while retaining a high cushiony effect as a seat.

In order to achieve such purpose, in accordance with the present invention, there is basically provided a seat back structure of vehicle seat, in which the seat back has one side to supportively receive a back of an occupant on the vehicle seat and another side opposite to that one side, comprising:

an elastic back support means provided in the foregoing one side of the seat back, the elastic back support means being adapted for resiliently supporting the back of the occupant;

a back board means provided in the foregoing another side of the seat back, the back board means having: one side facing to the aforesaid one side of the seat back; and another side facing to the aforesaid another side of the seat back;

a movable connection means for connecting the elastic back support means and back board means with the seat back so as to allow displacement of the back board means in a direction from a home position to one of those one and another sides of the seat back, while allowing the elastic back support means to be resiliently warped in a direction to the afore-said one of the afore-said one and another sides of the seat back;

a stopper means for preventing movement of the back board means from the home position toward the aforesaid another side of the seat back, and a biasing means for normally biasing the back board means to the home position;

wherein the back board means is retained by the stopper means at the home position, thereby withstanding a first load applied to the foregoing another side of back board means and allowing the back board means to be usable as a means for carrying load and cargo thereon, and wherein, by contrast, when a second load is applied in a direction to the foregoing one side of seat back, the elastic back support means is resiliently warped toward that particular one side of the back board means, which in turn causes the back board means to displace toward the same another side of seat back against a biasing force of the biasing means, so that both elastic back support means and back board means are resiliently displaced toward the said another side of the seat back.

Preferably, the elastic back support means may comprise an elastic member of a substantially thin-plate configuration and the back board means may be connected with the back support means.

Preferably, the back board means may comprise a plurality of separate plate elements which are movably connected with one another in such a manner that, when the second load is applied toward the foregoing one side of the seat back, the plurality of separate plate elements are deformed and warped toward the foregoing another side of the seat back against the biasing force of the biasing means, while by contrast, when the first load is applied toward the foregoing another side of the seat back, the plurality of separate plate elements are engaged with one another to provide a robust continuous plane and retained by the stopper means at the home position so as to withstand the first load and thereby be usable as a means for carrying load and cargo on the robust continuous plane.

Other various features and advantages of the present invention will become apparent from reading of the descriptions hereinafter, with reference to the annexed drawings.

DETAILED DESCRIPTION OF PREFERRED EMBODIMENTS OF THE INVENTION

Figure 1:
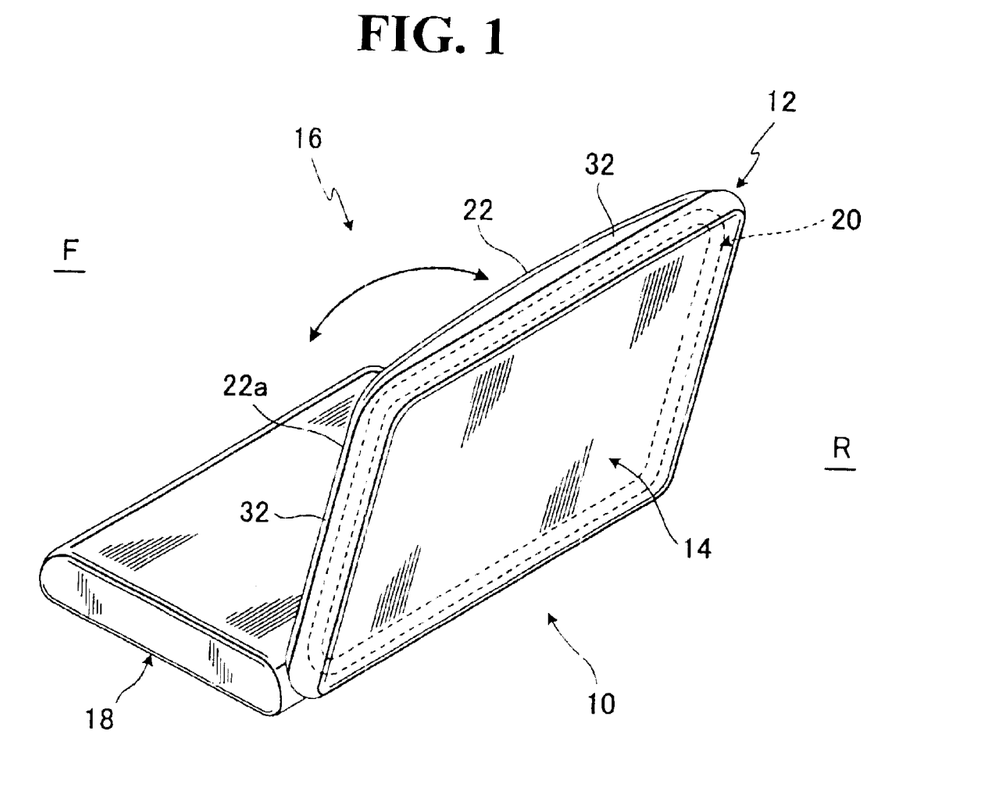
FIG. 1 is a schematic perspective view of a vehicle seat in which the seat back structure of the present invention is provided.
Figure 2:
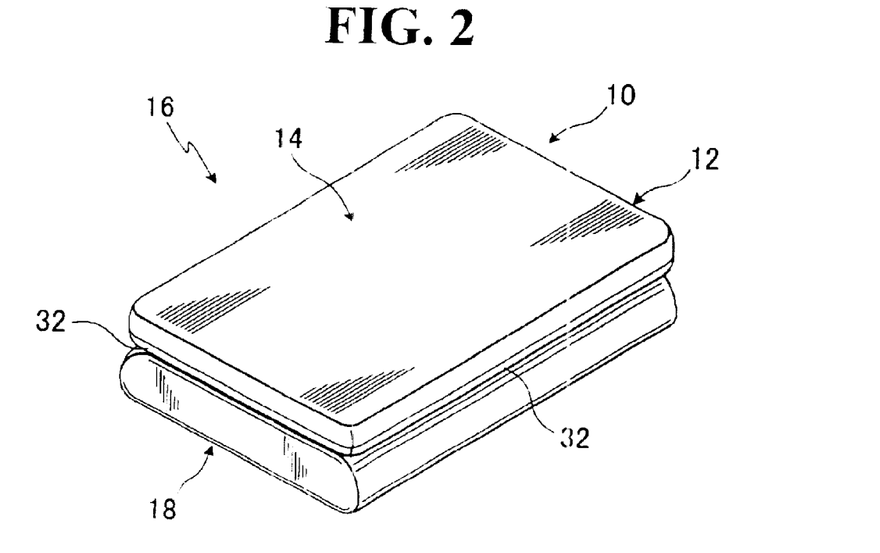
FIG. 2 is a schematic perspective view of the vehicle seat, which shows the state where the seat back is folded onto a seat cushion.

As shown in FIGS. 1 and 2, generically stated, the present invention provides a structure of seat back, generally designated by (10), in a vehicle seat (16). The illustrated vehicle seat (16) is of a well-known fold-down type comprising a seat cushion (18) and a seat back (12) pivotally connected with the seat cushion (18), such that the seat back (12) may be rotated or flipped over in the forward and backward directions as indicated by the arrow in FIG. 1. Hence, as indicated in FIG. 2, the seat back (12) can be folded down onto the seat cushion (18), in which case, the back side of the seat back (12) will be exposed outwardly and will serve as a load-carrying platform in a vehicle cabin or cargo loading section in vehicle (not shown). In general, as seen from FIGS. 1 and 8, the seat back structure (10) is comprised of a seat back frame (20), an elastic sheet member (22), a back board means (14), a movable connection means (2), wherein the back board means (14) and movable connection means (2) are a principal part of the present invention as will be elaborated later, and peripheral bolster cover potions (28).

In brief, as shown, the seat back frame (20) is formed by bending a tubular metallic material into a generally rectangular shape having four sides, which forms a typical rectangular contour of the seat back (12). The elastic sheet member (22) is secured at the four sides thereof to the corresponding four sides of the seat back frame (20) via the movable connection means (2) to be elaborated later, so as to be disposed on one side of the seat back (12), while on the other hand, the back board means (14) is connected at the four sides thereof to the corresponding four sides of seat back frame (20) via that movable connection means (2), so as to be disposed on another side of the seat back (12). Designation (22a) denotes a frontal surface or a seat occupant's back support side of the elastic sheet member (22) which normally faces in the forward direction (i.e. to the side (F) ) and is an area adapted to support the back of an occupant on the seat (16). Needless to mention, the foregoing one and another sides of seat back (12) correspond to the forward and backward sides of that particular seat back (12) when the seat back (12) itself is in an normal upright use position as shown in FIG. 1.

The elastic sheet member (22) itself is known in the art and has been disclosed, for example, from the Japanese Laid-open Patent Pub. No. 11-192138. However, such elastic sheet member (12) is not limitative, but any other elastic thin-plate element may be employed. For example, a thin net fabric sheet formed from fiber woven fabric may be used. As shown, the elastic sheet member (22) is small in size relative to the seat back frame (20).

In this context, it is noted that, throughout the description, hereinafter, the wording "forwardly" or the wording "forward direction" shall refer to a direction toward a forward side (F) of the seat (16), whereas the wording "backwardly" or the wording "backward direction" shall refer to a direction toward a backward side (R) of the seat (16).

In accordance with the seat back structure (10) of the present invention, the backward side of the seat back (12) is provided with a novel combination of a back board means (14) and a movable connection means (2), which allows the back board means (14) to be retained at a predetermined home position against movement in one direction for use as a robust load-carrying platform, while allowing displacement of the back board means (14) in another direction opposite to that one direction in order for the elastic sheet member (22) to be resiliently warped in the same direction, thereby giving an optimum conformable and deep support touch to the back of passenger resting thereon.

At first, it should be understood that, in FIGS. 3 to 8, three exemplary embodiments of the foregoing back board means (14) are suggested within the gist and scopes of the present invention, and therefore, they are not limitative, but may be embodied in any other alternative fashion within the scopes and purposes of the present invention. Namely, the first, second and third embodiments are respectively shown in one set of FIGS. 3 and 4, one set of FIGS. 5 and 6, and one set of FIGS. 7 and 8. As clearly conceivable from those figures, a common inventive concept given in the three embodiments, by way of example, is to provide a simplified and thin structure using an elastic sheet member (22) and a movable connection means (2) so as to allow elastic forward and backward displacement of the back board means (14) as well as the corresponding forward and backward warping of the elastic sheet member (22) with respect to a seat back frame (20), while allowing the back board means (14) to be used as a robust load-carrying platform or the like.

Figure 3:
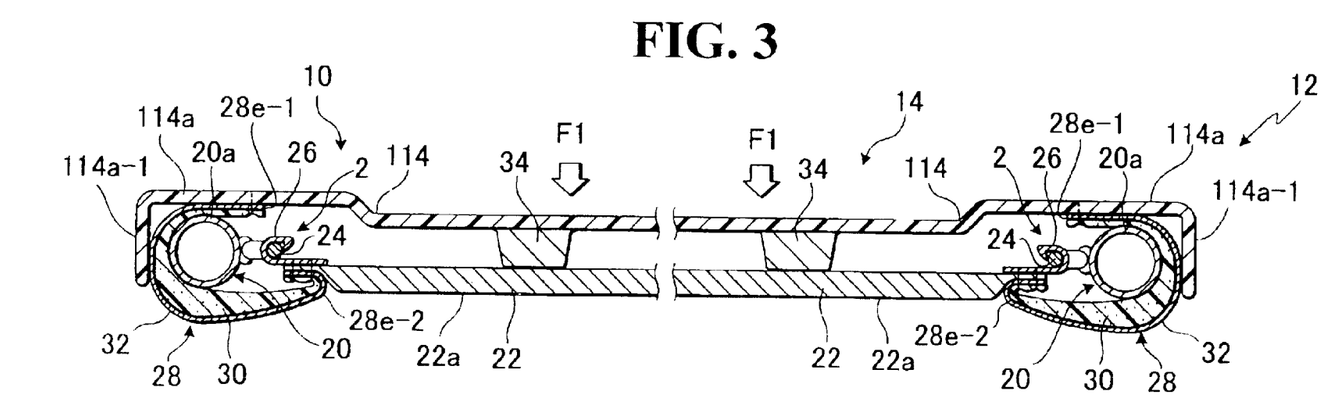
FIG. 3 is a partly broken sectional view showing a principal part of a first embodiment of the seat back structure in accordance with the present invention.
Figure 4:
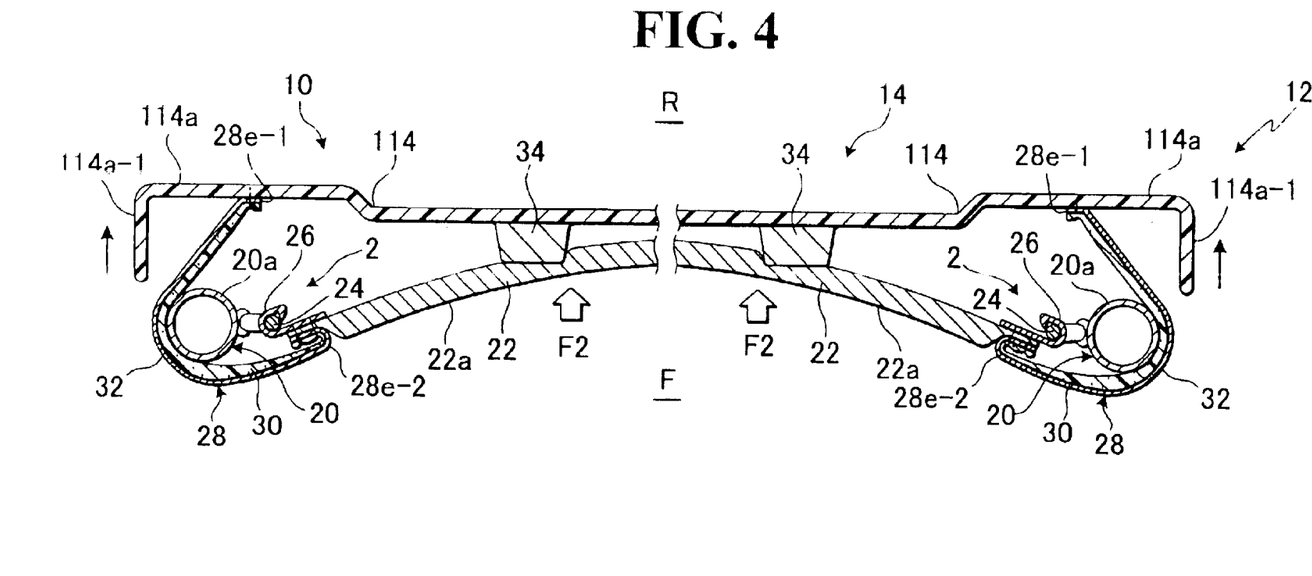
FIG. 4 is a partly broken sectional view of the first embodiment of seat back structure, which explanatorily shows a resilient deformation of the seat back responsive to a load applied thereto.

Reference is now made to a first embodiment shown in FIGS. 3 and 4. According thereto, as shown in FIG. 3, the seat back frame (20) is formed by a tubular material into a generally rectangular shape as typically known, as stated earlier, and there is shown one mode of the back board means (14) which comprises a back board member (114) having a peripheral protuberant flange portion (114a).

The illustrated back board member (114) is formed by means of a suitable molding from a synthetic resin material into the illustrated configuration in section. While not completely shown, but understandable from FIGS. 3 and 4, the back board member (114) is formed with the peripheral flange portion (114a) in the whole peripheral end thereof. The peripheral flange portion (114a) is so formed to protrude from a horizontal plane on which the back board member (114) extends, thus continuously extending from that particular another side of back board member (114) in an offset manner, and further terminate in an angled wall portion (114a-1).

In the present embodiment, the movable connection means (2) comprises: engagement hook pieces (26) fixedly attached to the end portions of the elastic member (22) as by sewing; engagement pieces (24) fixed as welding to the inwardly and opposedly facing sides of seat back frame (20); and the peripheral bolster cover portions (28).

Each peripheral bolster cover portion (28) is formed from a trim cover assembly of a two-layer lamination structure comprising an outer cover layer (32) and a foam wadding layer (30) adhered to the reverse side of the outer cover layer (32). This peripheral bolster cover portion (28) is folded about the seat cushion frame (20), such that the foam wadding layer (30) embracingly contacts substantially a half peripheral portion of the seat cushion frame (20). As shown, one end (28e-1) of the peripheral bolster cover portion (28) is fixedly connected with the one side of back board member (114) as by sewing, wherein such one side of back board member (114) is a reverse side of the same and faces to a forward side (F) when the seat back (12) is in a normal upright position as in FIG. 1. On the other hand, another end (28e-2) of the peripheral bolster cover portion (28) is fixedly connected with one end of the elastic sheet member (22) as by sewing. The peripheral bolster cover portions (2) protrude from a plane where the elastic sheet member (22) lies, thereby serving to elastically support both lateral body portions of a passenger sitting on the seat (16).

As shown in FIG. 3, the engagement hook pieces (26) are movably engaged with the engagement pieces (24), whereby the elastic sheet member (22) is connected at its ends with the seat back frame (20) in such a manner as to be hingedly rotatable relative thereto. The back board member (114) is securely attached, via the peripheral bolster cover portions (28), to one side of the seat cushion frame (20) that normally faces to the forward side (F) when the seat back (12) is in the upright use position as in FIG. 1. More specifically, as seen in FIG. 3, the peripheral flange portion (114a) of the back board member (114) is resiliently biased by the elastic drawing force of the peripheral bolster cover portions (28) into abutment against a local side area (20a) of the seat cushion frame (20) that normally faces to the backward side (R) when the seat back (12) is in the upright use position as in FIG. 1.

Designations (34) denotes a plurality of connecting pieces fixedly connected between the back board member (114) and the elastic sheet member (22). But, it should be noted that the connecting pieces (34) may not be used, and, instead thereof, the elastic sheet member (22) may be directly and fixedly connected with the back board member (114) by an adhesive or other securing means.

With the above-described arrangement, the back board member (114) is normally abutted against the local side area (20a) of seat cushion frame (20), which means that such particular seat cushion frame (20) serves as a stopper to retain the back board member (114) in a normal home position relative to the seat cushion frame (20) and prevent excessive movement of the back board member (114) towards a side where the elastic sheet member (22) lies. The fact that the elastic sheet member (22) is at the ends (28e-2) thereof movably connected with the engagement pieces (24) and the back board member (114) is connected via the connecting pieces (34) with the foregoing elastic sheet member (22), allows resilient warping of elastic sheet member (22) and displacement of the back board member (114) in forward and backward directions relative to the seat back frame (20), as understandable from FIGS. 3 and 4.

While not completely shown, it should be understood that the aforementioned peripheral bolster cover portions (28) and movable connection means (2) are provided to and along all the four sides of the seat back frame (20), and that the elastic sheet member (22) is of a square plate configuration and connected with another ends (28e-2) of the peripheral bolster cover portions (28), thereby being disposed inwardly of the rectangular seat back frame (20), while on the other hand, the back board member (114) is of a square shape and connected with one ends (28e-1) of the peripheral bolster cover portions (28) so that the peripheral flange portions (114a) as well as the associated angled walls (114a-1) thereof extend along all fours sides of both peripheral bolster cover portions (28) and seat back frame (20) in such a manner as to overhang and embrace the four corners of those particular peripheral bolster cover portions (28) and seat back frame (20).

Figure 7:
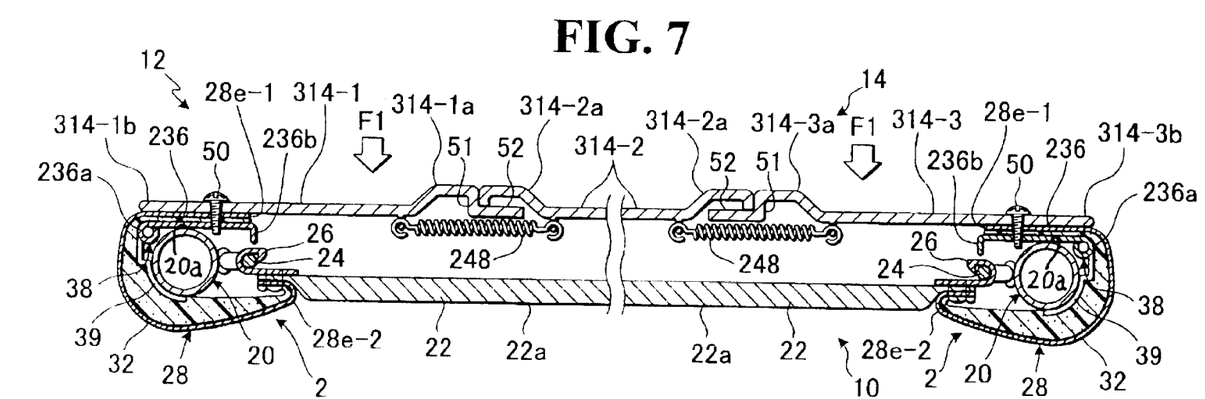
FIG. 7 is a partly broken sectional view showing a principal part of a third alternative embodiment of the seat back structure in accordance with the present invention.

As stated above, according to the present mode of seat back structure (10), the back board member (114) is displaceable from the home position as shown in FIG. 7 in a direction backwardly of the seat back frame (20) and connected directly with the reverses side of the elastic sheet member (22) via the connecting pieces (34).

With the above-described construction, referring to FIG. 3, let us now assume that a load (F1) is applied to the back board member (114), particularly when the seat back (12) is folded onto the seat cushion (16) as shown in FIG. 2. In that case, the back board member (114) is assuredly prevented against movement toward the elastic sheet member (22) because the peripheral flange portions (114a) are abutted against the local side area (20a) of seat back frame (20) and that particular local side area (20a) serves as a stopper to prevent movement the back board member (114) from the home position toward the elastic sheet member (22). Hence, under such state, the back board member (114) is robust enough to withstand the load (F1) and can be used as load-carrying platform to permit load and luggage to be loaded thereon.

On the other hand, referring to FIG. 4, let us assume that a load (F2) is applied to the elastic sheet member (22), which means that an upper body portion of a passenger is leaned against the elastic sheet member (22) in the backward direction, when the seat back (12) is in the normal upright use position as shown in FIG. 1. In that case, the elastic sheet member (22) is resiliently warped and displaced backwardly relative to the engagement pieces (24) toward the back board member (114). Simultaneous therewith, the back board member (114) is displaced backwardly. At this point, the peripheral bolster cover portions (28) are resiliently pulled and extended by both of the thus-warped elastic sheet member (22) and the thus-displaced back board member (114). It is therefore appreciated that the back board member (114) does not interfere with the backward warping of the elastic sheet member (22), and that the passenger sitting on the seat (16) can feel a sufficient deep cushiony touch of the elastic sheet member (22) without feeling the hardness of the back board member (114).

Accordingly, the seat back structure (10) of the present invention allows use of the known thin elastic sheet member (22) to reduce the thickness of the seat back (12) without any care about the cushiony touch of the elastic sheet member (22) and the hard touch of the back board member (114). In other words, no matter of how the seat back (12) may be reduced in thickness by using such thin elastic sheet member (22) or the like, the back board member (114) retains its rigidity against the load (F1) and can be used as a robust load-carrying platform, whereas the elastic sheet member (22) or any other thin backrest material equivalent thereto can retain is own elasticity, regardless of the presence of robust back board member (114), thereby assuring to attain a deep cushiony touch to a passenger who leans his or her back against the seat back (12).

Since the back board member (114) is connected by the peripheral bolster cover portions (28) with the elastic sheet member (22), even when the back board member (114) is moved backwardly together with the elastic sheet member (22) away from the seat back frame (20), the peripheral bolster cover portions (28), which is being resiliently extended in the likewise backward direction, serves to limit such backward movement of both back board member (114) to a predetermined maximum point as long as the peripheral bolster cover portions themselves. Also, the peripheral bolster cover portions (28), by the reason of their elastic property, act to resiliently return both back board member (114) and elastic sheet member (22) to their respective normal home positions shown in FIG. 3. In addition, such peripheral bolster cover portions (28) are advantageous in providing a complete shield to a space which is created between the back board member (114) and elastic sheet member (22) when the latter members (114 and 22) are moved backwardly as in FIG. 4, thereby insuring to prevent any foreign materials from being inserted into that space and concealing any objectionable state between those two members (114) (22) to aesthetically improve an outer appearance of seat back (12).

Figure 5:
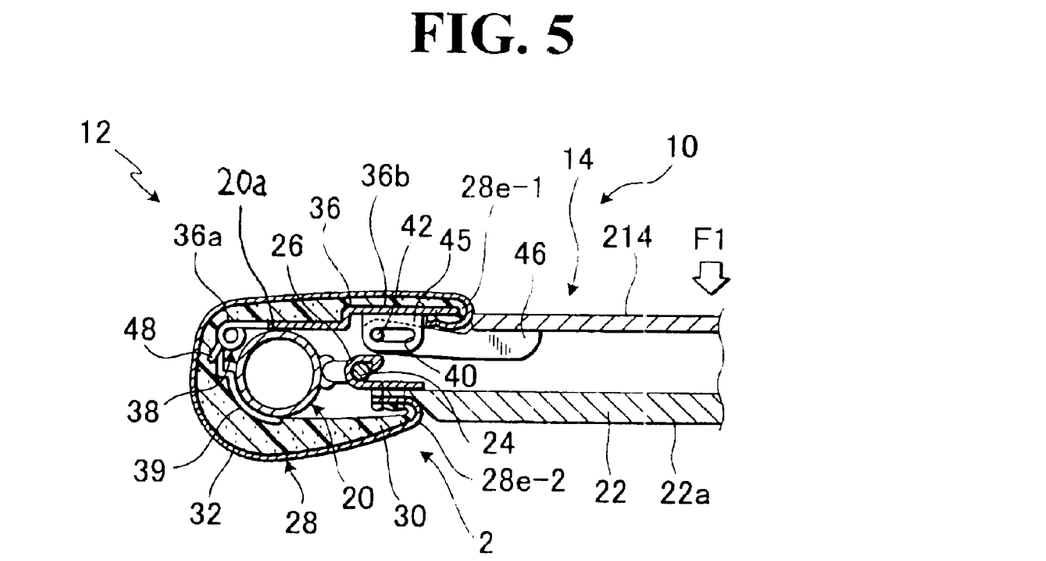
FIG. 5 is a fragmentary sectional view showing a principal part of a second alternative embodiment of the seat back structure in accordance with the present invention.
Figure 6:
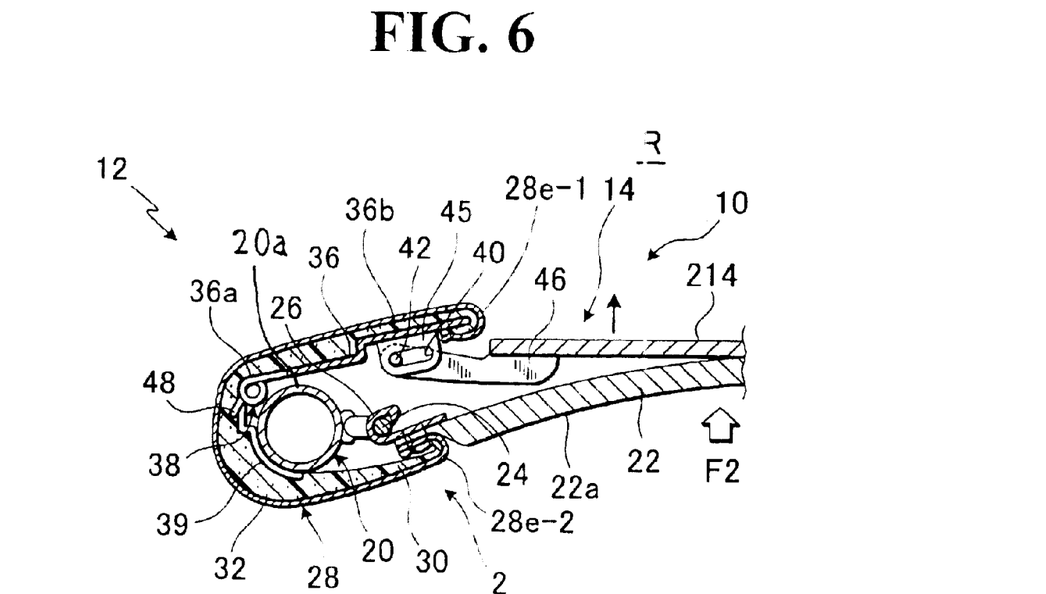
FIG. 6 is a fragmentary sectional view of the second embodiment of seat back structure, which explanatorily shows a resilient deformation of the seat back responsive to a load applied thereto.

Reference is made to a second alternative embodiment shown in FIGS. 5 and 6. In this particular mode, the seat back frame (20) identical to the foregoing first embodiment is used, and there is shown another mode of the back board means (14) which comprises a flat back board member (214) which has not any flange portion as in the first embodiment.

While FIGS. 5 and 6 only show, in section, one right-side portion of the seat back (12) in the present embodiment, it should be noted that another right-side portion of the seat back (12) is provided as likewise in the first embodiment shown in FIGS. 3 and 4.

In the present embodiment, the movable connection means (2) includes the previously described engagement hook pieces (26) and engagement pieces (24) which are used in the first embodiment. Further, as far as the FIGS. 5 and 6 are concerned, the movable connection means (2) is shown to comprise: a support bracket (39) fixed to the seat back frame (20); a rotary support plate member (36) hingedly connected with the support bracket (39); a first connecting bracket (45); and a second connecting bracket (46) movably connected with the first connecting bracket (45). However, while not shown, it should be understood that the movable connection means (2) comprises a plurality of the support brackets (39), a plurality of the rotary support plate members (36), and a plurality of the first and second connecting brackets (45) (46). Any person skilled in the art will naturally understand such structural condition and requirement, considering the nature of the present invention and the drawings.

Likewise as in the first embodiment, the engagement hook pieces (26) are fixedly attached to the end portions of the elastic sheet member (22) as by sewing, while the engagement pieces (24) are fixed as welding to the inwardly and opposedly facing sides of seat back frame (20).

As illustrated, the support bracket (39) is fixedly attached, at its curved base portion, to an outer side of the seat cushion frame (20) which is opposite to the inwardly facing side of the seat cushion frame (20). The rotary support plate member (36) is provided integrally with a hinge (38) in a base end portion (36a) thereof. The hinge (38) is therefore disposed at a point outwardly of the seat back frame (20), as seen in FIG. 5, and connected via a spring (48) with a free projected end of the support bracket (39) such that the rotary support plate member (36) is normally resiliently biased by the spring (48) into contact upon the seat back frame (20).

Fixed to the reverse side of free end portion (36b) of the rotary support plate member (36) is the first connecting bracket (45) which has a horizontally elongated hole (40) formed therein. On the other hand, fixed to the reverse side of one end portion of the back board member (214) is the second connecting bracket (46) which extends toward the seat back frame (20) and first connecting bracket (45), terminating in a free end portion having a connecting pin (42) formed therewith, the connecting pine (42) projecting laterally of the second connecting bracket (46). As shown, the connecting pin (42) is slidably inserted in the foregoing elongated hole (40) of first connecting bracket (45). It is observed that the elongated hole (40) is disposed level with a point where the rotary support plate member (36) is contacted on the local side region (20a) of the seat back frame (20).

Likewise as in the first embodiment, each peripheral bolster cover portion (28) used in this second embodiment is formed by a trim cover assembly of a two-layer lamination structure comprising an outer cover layer (32) and a foam wadding layer (30) adhered to the reverse side of the outer cover layer (32). As shown in FIG. 5, the peripheral bolster cover portion (28) is folded about the seat cushion frame (20) in such a manner that the foam wadding layer (30) thereof embracingly overlies and contacts all of the seat cushion frame (20), support bracket (39), hinge (38) and rotary support plate member (36). In the present embodiment, one end (28e-1) of the peripheral bolster cover portion (28) is folded over and fixedly connected with the free end portion (36b) of rotary support plate member (36), whereas another end (28e-2) of the peripheral bolster cover portion (28) is fixedly connected with one end of the elastic sheet member (22) as by sewing.

Likewise as in the first embodiment, the securing hook pieces (26) are movably engaged with the engagement pieces (24), so that the elastic sheet member (22) is hingedly connected at its ends with the seat back frame (20).

With the above-described arrangement, the rotary support plate member (36) is normally abutted against the local side area (20a) of seat cushion frame (20), and the connecting pin (42) of the second bracket (46) is contacted with one edge of the horizontally elongated hole (40) of the first bracket (45), so that both rotary support plate member (36) and back board member (214) are retained on the same horizontal line. This means that such particular seat cushion frame (20), rotary support plate member (36), first and second brackets (45) (46) and connecting pin (42) cooperate with one another to serve as a stopper to retain the back board member (114) in a normal home position relative to the seat cushion frame (20) and prevent excessive movement of the back board member (114) towards a side where the elastic sheet member (22) lies. The fact that the elastic sheet member (22) is movably connected with the engagement pieces (24) and the back board member (114) is connected via the connecting pieces (24) with the foregoing elastic sheet member (22), allows resilient warping of the elastic sheet member (22) and displacement of the back board member (114) in forward and backward directions relative to the seat back frame (20), as understandable from FIGS. 3 and 4.

While not completely shown, it should be understood that the aforementioned peripheral bolster cover portions (28) and movable connection means (2) are provided to and along all the four sides of the seat back frame (20), and that the elastic sheet member (22) is of a square plate and connected with another end (28e-2) of the peripheral bolster cover portion (28), thereby being disposed inwardly of the rectangular seat back frame (20), while on the other hand, the back board member (214) is of a square shape and connected with the rotary support plate member (36) via the first and second connecting brackets (45) (46) so as to be disposed inwardly of the rectangular seat back frame (20).

As stated above, according to the present second mode of seat back structure (10), the back board member (214) and elastic sheet member (22) are displaceable from their respective home positions shown in FIG. 5 in a direction backwardly of the seat back frame (20) as shown in FIG. 6.

With the above-described construction, referring to FIG. 5, let us now assume that a load (F1) is applied to the back board member (214), particularly when the seat back (12) is folded onto the seat cushion (18) as shown in FIG. 2. In that case, the back board member (214) is assuredly prevented against movement toward the elastic sheet member (22) because the rotary support plate member (36) is contacted on the seat back frame (20) and the connecting pin (42) is contacted with one edge of the elongated hole (40), as in FIG. 5, thereby serving as a stopper to prevent movement of the back board member (214) from the home position toward the elastic sheet member (22). Hence, under such state, the back board member (214) is robust enough to withstand the load (F1) and can be used as load-carrying platform to permit load and luggage to be loaded thereon.

On the other hand, referring to FIG. 6, let us assume that a load (F2) is applied to the elastic sheet member (22), which means that an upper body portion of a passenger is leaned against the elastic sheet member (22), in the backward direction, when the seat back (12) is in the normal upright use position as shown in FIG. 1. In that case, the elastic sheet member (22) is resiliently warped and brought backwardly relative to the engagement pieces (24) into contact with the back board member (214). As a result thereof, the back board member (214) is displaced backwardly, thereby causing the rotary support plate member (36) to rotate about the hinge (38) in the backward direction against the biasing force of the spring (48). At this moment, the connecting pin (42) is slidingly movable in and along the elongated hole (40), thus giving a certain play therebetween enough to allow smooth rotational movement of the rotary support plate member (36) about the hinge (38), while simultaneously allowing smooth transnational movement of the back board member (214) along the forward and backward directions as can be seen from FIG. 6.

It is therefore appreciated that the back board member (214) does not interfere with the backward warping of the elastic sheet member (22), and that the passenger sitting on the seat can feel a sufficient deep cushiony touch of the elastic sheet member (22) without feeling the hardness of the back board member (214).

Accordingly, the seat back structure (10) in accordance with the second embodiment also allows use of the known thin elastic sheet member (22) to reduce the thickness of the seat back (12) without any care about the cushiony touch of the elastic sheet member (22) and the hard touch of the back board member (214). In other words, no matter of how the seat back (12) may be reduced in thickness by using such thin elastic sheet member (22) or the like, the back board member (214) retains its rigidity against the load (Fl) and can be used as a robust load-carrying platform, whereas the elastic sheet member (22) or any other thin back rest material equivalent thereto can retain its own elasticity, regardless of the presence of robust back board member (214), thereby assuring to attain a deep cushiony touch to a passenger who leans his or her back against the seat back (12).

In this context, it is to be seen that, when the back board member (214) is moved far backwardly together with the elastic sheet member (22) away from the seat back frame (20), the connecting pin (42) is brought to contact with another edge of the elongated hole (40) (i.e. the left-side edge of elongated hole (40) as viewed from FIG. 6), thereby serving to limit an excessive backward movement of both back board member (214) and elastic sheet member (22). Also, it is to be seen that, under the biasing force of spring (48), both back board member (214) and elastic sheet member (22) are automatically returned to their respective normal home positions shown in FIG. 5, when the seat back (12) is in no use, or no load (F2) is applied thereto.

With regard to the back board means (14), the first and second embodiments suggest to provide a unitary one piece of back board member (114 or 214). This is however not limitative, but, the back board means (14) may comprise an articulated mode of back board member formed by a plurality of plate elements, each being movably connected with one another in order to permit for articulated backward deformation or warping of the back board member per se to provide a deep and comfortable supporting touch to a passenger's back. Such mode of back board member is shown by way of example in FIGS. 7 and 8.

Figure 8:
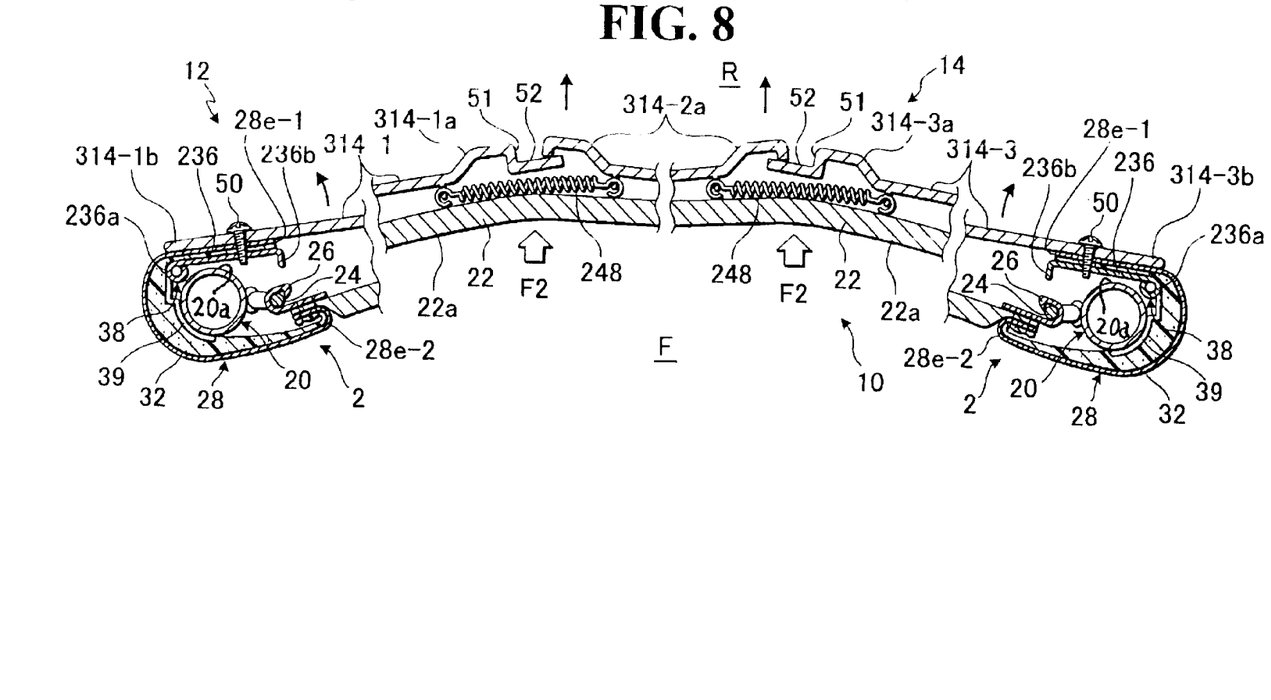
FIG. 8 is a partly broken sectional view of the third embodiment of seat back structure, which explanatorily shows a resilient deformation of the seat back responsive to a load applied thereto.

Referring now to the FIGS. 7 and 8, the back board means (14) is embodied by an articulated back board member essentially composed of first, second and third plate elements (314-1) (314-2) and (314-3). In the present third embodiment, the elastic sheet member (22) and peripheral bolster portion (28) are basically identical to those described in the foregoing second embodiment, except that a structural difference exists in the movable connecting means (2) between the second and third embodiment. All like designations to be used hereinafter correspond to all like designations that has been given in the second embodiment described above, and no further explanation is made about the common elements and parts between the second embodiment and the present third embodiment.

According to the present embodiment, as shown in FIG. 7, the movable connection means (2) employs a rotary support plate member (236) which is different in structure from the movable connection means (2) of the foregoing second embodiment. The illustrated rotary support plate member (236) is integrally provided with the hinge (38) in the base end portion (236a) thereof. The hinge (38) is connected with the support bracket (39). The rotary support plate member (236) is normally contacted upon the local side area (28a) of the seat back frame (20) and rotatable about the hinge (38) in a direction toward and away from that local side area (28a). As shown, one end portion (28e-1) of the peripheral bolster cover portion (28) is securely connected with a free end portion (236b) of the rotary support plate member (236).

While not shown, it should be understood that the movable connection means (2) comprises a plurality of the support brackets (39), a plurality of the rotary support plate members (36), a plurality of engagement pieces (26) and a plurality of engagement hook members (26). Any person skilled in the art will naturally understand such structural condition and requirement, considering the nature of the present invention and the drawings.

The first plate element (314-1) is so formed to have a flat end portion (314-1b) and a connecting end portion (314-1a) of a generally channel cross-section which projects outwardly from the outer side of the first plate element (314-1) opposite to the elastic sheet element (22). As similar to this first plate element (314-1), the third plate element (314-3) is so formed to have a flat end portion (314-3b) and a connecting end portion (314-3a) of a generally channel cross-section which projects outwardly from the outer side of the third plate element (314-3) opposite to the elastic sheet element (22).

As illustrated, the connecting end portions (314-1a) (314-3a) respectively of the first and third plate elements (314-1) (314-3) are formed with a vertical engagement region (51) and a horizontal engagement region (52).

By contrast, the second plate element (314-2) is formed with a pair of connecting end portions (314-2a) (314-2a), each being of a generally channel cross-section projecting outwardly from the outer side of the second plate element (314-2) itself opposite to the elastic sheet element (22).

As shown in FIG. 7, the flat end portion (314-1b) of first plate element (314-1) is juxtaposed on the peripheral bolster cover potion end (28e-1) and firmly connected with the rotary support plate member (236) by means of a securing screw (50). Likewise, the flat end portion (314-3b) of third plate element (314-3) is juxtaposed on the peripheral bolster cover portion end (28e-1) and firmly connected with the rotary support plate member (236) by means of a securing screw (50). On the other hand, the second plate element (314-2) is extended and biasingly connected between those first and third plate elements (314-1) (314-3) by means of one pulling spring (248) connected between the first and second plate elements (314-1) (314-2) as well as by means of another pulling spring (248) connected between the second and third plate elements (314-2) (314-3).

With the above-described arrangement, normally, under the elastic contracting forces of the springs (248), the two connecting end portions (314-2a) of the second plate element (314-2) are each positively biased into engagement with the vertical and horizontal engagement regions (51) (52) of each of the two connecting end portions (314-1a) (314-3a) respective of the first and third plate elements (314-1) (314-3). Also, at the same time, under such elastic contacting forces of the springs (248), the rotary support plate members (236) are biased to contact with the local side region (20a) of the seat back frame (20). Thus, all the first, second and third plate elements (314-1) (314-2) (314-3) are retained in alignment with one another on the same horizontal rectilinear line, thereby providing a robust continuous horizontal plane. This is a home position of those three plate elements (314-1) (314-2) and (314-3).

With the above-described construction, referring to FIG. 7, let us now assume that a load (F1) is applied to the foregoing articulated mode of back board member, particularly when the seat back (12) is folded onto the seat cushion (18) as shown in FIG. 2. In that case, all the three plate elements (314-1, 314-2 and 314-3) are firmly engaged with one another at their respective connecting end portions (314-1a, 314-2a, 314-3a) against deformation in a direction corresponding to the direction wherein the load (F1) is applied to the three plate elements. This is because, as far as the FIG. 7 are viewed, the two rotary support plate members (236) connected with the respective two flat end portions (314-1b) (314-3b) of the first and third plate elements (314-1) (314-3) are contacted on the seat back frame (20), and further, each connecting end portion (314-2a) of the second plate element (314-2) is firmly engaged with both vertical and horizontal engagement regions (51) (52), thereby serving as a stopper to prevent all the three plate elements (314-1) (314-2) (314-3) against movement towards the elastic sheet member (22) and thus retain them in alignment with one another on the same rectilinear line. Accordingly, under that state, the three plate elements (314-1) (314-2) and (314-3) effectively provide a robust horizontal plane enough to withstand the load (F1) and can be used as a load-carrying platform to permit load and luggage to be loaded thereon.

On the other hand, referring to FIG. 8, let us assume that a load (F2) is applied to the elastic sheet member (22), which means that an upper body portion of a passenger is leaned against the elastic sheet member (22), in the backward direction, when the seat back (12) is in the normal upright use position as shown in FIG. 1. In that case, the elastic sheet member (22) is resiliently warped and brought backwardly relative to the engagement pieces (24) into contact with all the three plate elements (314-1) (314-2) (314-3). As a result thereof, both first and third plate elements (314-1) (314-3) are rotated backwardly about their respective hinges (38) against the contacting forces of the springs (248), which in turn displaces the second plate element (314-2) in the backward direction, such that the two connecting end portions (314-1a) (314-3a) respective of the first and third plate elements (314-1) (314-3) are each slidingly moved away from the respective two connecting end portions (314-2a) (314-2a) of the second plate element (314-2). In this regard, strictly sated, as shown in FIG. 8, the two connecting end portions (314-2a) of the second plate element (314-2) are slidingly moved on and along the respective two horizontal engagement regions (52) of the first and third plate elements (314-1) (314-3). Thus, it is seen that a whole of the back board means (14) is deformed or warped in an articulated way.

In this connection, it is noted that the maximum extendable length of the spring (248) is a limit against the backward articulated movements of all the three plate elements (314-1) (314-2) and (314-3) so as to prevent disengagement of the second plate element (314-2) from the first and third plate elements (314-1) (314-3). Hence, the spring (248), when extended to a maximum extendable length and no longer extendable, serves as a stopper to prevent excessive backward warping of a whole of the back board means (14) or excessive backward articulated movement of the three plate elements (314-1) (314-2) and (314-3).

Accordingly, in the present third embodiment, it is to be appreciated that a whole of the seat back (12) embarcingly support the upper body portion of a passenger sitting on the seat so that he or she can feel a deep and conformable support touch at his or her back, and that all the same advantages and effects as described in the first and second embodiment are surely attainable.

While having described the present invention thus far, it should be finally understood that the invention is not limited to the illustrated embodiments, but any other modification, replacement and addition may be applied thereto without departing from the scopes of the appended claims.

What is claimed is:

1. A seat back structure of vehicle seat, in which the seat back has one side to supportively receive a back of an occupant on the vehicle seat and another side opposite to said one side, comprising:

an elastic back support means provided in said one side of said seat back, said elastic back support means being adapted for resiliently supporting the back of said occupant;

a back board means provided in said another side of said seat back, said back board means having: one side facing to said one side of said seat back; and another side facing to said another side of said seat back;

a movable connection means for connecting said elastic back support means and said back board means with said seat back so as to allow displacement of the back board means in a direction from a home position to one of said one and another sides of said seat back, while allowing the elastic back support means to be resiliently warped in a direction to said one of said one and another sides of said seat back;

a stopper means for preventing movement of said back board means from said home position toward said one side of said seat back, and a biasing means for normally biasing said back board means to said home position;

wherein said back board means is retained by said stopper means at said home position, thereby withstanding a first load applied to said another side of the back board means and allowing the back board means to be usable as a means for carrying load and cargo thereon, and wherein, by contrast, when a second load is applied in a direction to said one side of the seat back, said elastic back support means is resiliently warped toward said one side of said back board means, which in turn causes the back board means to displace toward said another side of said seat back against a biasing force of said biasing means, so that both said elastic back support means and said back board means are resiliently displaced toward said another side of said seat back.

2. The seat back structure as claimed in claim 1, wherein said back board means comprises one unitary rigid piece of back board member, and wherein said elastic back support means comprises an elastic member of a substantially thin plate configuration.

3. The seat back structure a claimed in claim 1, wherein said back board means is connected with said back support means.

4. The seat back structure as claimed in claim 1 which further comprises a seat back frame, wherein said back board means is large in size relative to said seat back frame, and wherein said stopper means comprises a local region of said seat back frame, with such an arrangement that said back board means is resiliently biased into contact with said local region under a biasing force of said biasing means.

5. The seat back structure as claimed in claim 1, wherein said back board means comprises a plurality of separate plate elements which are movably connected with one another in such a manner that, when said second load is applied toward said one side of said seat back, said plurality of separate plate elements are deformed and warped toward said another side of said seat back against the biasing force of said biasing means, while by contrast, when said first load is applied toward said another side of said seat back, said plurality of separate plate elements are engaged with one another to provide a robust continuous plane and retained by said stopper means at said home position so as to withstand the first load and thereby be usable as a means for carrying load and cargo on the continuous plane.

6. The structure of seat back according to claim 5, wherein said biasing means comprises a plurality of springs, and wherein said plurality of separate plate elements are movably connected with one another at the respective end portions thereof via said plurality of springs.

7. The seat back structure according to claim 6, wherein said end portions of said plurality of separate plate elements include vertical regions and horizontal regions, with such an arrangement that said vertical regions are slidably engaged with said horizontal regions.

8. The seat back structure as claimed in claim 1 which further comprises a seat back frame so formed to have at least four sides, wherein said movable connection means, said stopper means and said biasing means are arranged on each of said at least four sides of said seat back frame, and wherein said elastic support means and said back board means are connected with said movable connection means.

9. The seat back structure as claimed in claim 1, wherein said movable connection means comprises: first engagement elements provided in said seat back; second engagement elements provided to said back board means, said second engagement elements being movably engaged with said first engagement elements; and peripheral bolster cover portions defined along lateral sides of said seat back, said peripheral bolster cover portions being formed from an elastic material that is extendable and contractible, wherein said biasing means comprises said peripheral bolster cover portions, and wherein said peripheral bolster cover portions are connected between said back board means and said elastic back support means.

10. The seat back structure as claimed in claim 1, wherein said movable connection means comprises: first engagement elements provided in said seat back; second engagement elements provided to said back board means, said second engagement elements being movably engaged with said first engagement elements; and rotary support elements rotatably provided in said seat back, wherein said elastic back support means is connected by said first and second engagement elements with said seat back, and wherein said back board means is movably connected by said rotary support elements with said seat back.

11. The seat back structure as claimed in claim 1, wherein said movable connection means comprises: first engagement elements provided in said seat back; second engagement elements provided to said back board means, said second engagement elements being movably engaged with said first engagement elements; and rotary support elements rotatably provided in said seat back, wherein said elastic back support means is connected by said first and second engagement elements with said seat back, wherein said back board means is connected by said rotary support elements with said seat back, wherein said back board means comprises a plurality of separate plate elements which are movably connected with one another in such a manner that, when said second load is applied toward said one side of said seat back, said plurality of separate plate elements are deformed and warped toward said another side of said seat back against the biasing force of said biasing means, while by contrast, when said first load is applied toward said another side of said seat back, said plurality of separate plate elements are engaged with one another to provide a robust continuous plane and retained by said stopper means at said home position so as to withstand the first load and thereby be usable as a means for carrying load and cargo on the continuous plane.

12. The structure of seat back as claimed in claim 1 which further comprises a seat back frame so formed to have at least four sides, wherein said movable connection means comprises: first engagement elements; second engagement elements provided to said elastic back support means, said second engagement elements being movably engaged with said first engagement elements; and rotary support elements, wherein said first engagement elements, said rotary support elements, said stopper means and said biasing means are arranged on each of said at least four sides of said seat back frame, such that said back board means is connected by said rotary support elements with said at least four sides of said seat back frame so as to be movable in the direction from said home position to said one of said one and another sides of said seat back with respect to said seat back frame, while said elastic back support means is connected by said first and second engagement elements with said at least four sides of said seat back frame so as to be able to be resiliently warped in the direction to said one of said one and another sides of said seat back with respect to said seat back frame.

13. The structure of seat back according to claim 12, which further comprises a first connecting means provided to said rotary support elements and a second connecting means provided to said back board means, such that said first connecting means is movably connected with said second connecting means, and wherein said stopper means comprises a local region of said each of said at least four sides of said seat back frame, with such an arrangement that said rotary support element is resiliently biased into contact with said local region under a biasing force of said biasing means, thereby normally retaining said back board means at said home position, while allowing rotational movement of said rotary support elements from said local region toward said another side of said seat back relative to said at least four sides of said seat back frame and simultaneously allowing translational movement of said back board means away from said home position toward said another side of said seat back with respect to said at least four sides of said seat back frame.

14. The structure of seat back according to claim 13, wherein said rotary support elements are rotatably connected by a hinge means with said at least four sides of said seat back frame, wherein said hinge means is disposed at a point outwardly of said seat back frame, wherein a connecting pin is provided in one of said first and second connecting means and an elongated hole is formed in another of said first and second connecting means, and wherein said connecting pin is slidably engaged in said elongated hole so as to insure to allow for said rotational and translational movements respectively of said rotary support elements and said back board means.

\* \* \* \* \*